US005802147A

United States Patent [19]

Beyda et al.

[11] Patent Number: 5,802,147
[45] Date of Patent: Sep. 1, 1998

[54] SYSTEM AND METHOD FOR NOTIFYING A USER OF AWAITING MESSAGES

[75] Inventors: William J. Beyda, Cupertino; Shmuel Shaffer, Palo Alto, both of Calif.

[73] Assignee: Siemens Business Communication Systems, Inc., Santa Clara, Calif.

[21] Appl. No.: 716,116

[22] Filed: Sep. 19, 1996

[51] Int. Cl.[6] ............................................. H04M 1/64
[52] U.S. Cl. .................. 379/67; 379/89; 379/102.06; 340/692; 340/825.31; 340/825.34
[58] Field of Search ................. 379/67, 88, 89, 379/102.06; 340/533, 535, 539, 306, 330, 825.31, 542, 543, 692, 825.34

[56] References Cited

U.S. PATENT DOCUMENTS 4,275,385  6/1981  White ............................. 379/2.1
5,349,636  9/1994  Iribarren ........................... 379/89
5,414,759  5/1995  Ishikari et al. ..................... 379/88

Primary Examiner—Fan S. Tsang
Attorney, Agent, or Firm—Heather S. Vance

[57] ABSTRACT

A system for notifying a user of awaiting messages is provided. In the preferred embodiment, this system includes a messaging device (30), a lock system (20), a central computer (40) and a output device (50). Central computer (40) processes signals from lock system (20) and to messaging device (30). Central computer (40) also monitors lock system (20) and sends user related information to messaging device (30). Output device (50) automatically contacts the user with information related to the awaiting messages.

18 Claims, 2 Drawing Sheets

SYSTEM AND METHOD FOR NOTIFYING A USER OF AWAITING MESSAGES

BACKGROUND OF THE INVENTION

1. Field of the Invention

The invention relates to notifying a user of awaiting messages, and more particularly to a system and a method for electrically connecting a messaging system with a door lock system.

2. Description of the Related Art

Telephone messaging systems (i.e., voice mail systems) are common and readily available. Electronic door lock systems are also common. For example, many hotels employ both. While currently available messaging systems are adequate, they have several shortcomings. For example, in hotels, users must remember to check the message waiting light to see if any messages have arrived. Hotels often rely on analog telephones, so it is not uncommon for the message waiting light bulb to burn out. Therefore, if the guest does not notice the light or does not remember to check the telephone, the guest will not know if any messages have arrived.

In addition, for simplicity, hotels do not usually utilize the password feature of their messaging systems. Thus, anyone with access to a guest's room can pick up the telephone and retrieve that guest's messages. This provides for little security. It is desirable to provide an intelligent interconnection between messaging systems and door lock systems to improve the communication of awaiting messages to users and to improve the security of the messaging system.

SUMMARY OF THE INVENTION

According to the invention, a system for notifying a user of awaiting messages is provided. This system includes a messaging device, a lock system, a connecting means and a contacting means. The connecting means processes signals from the lock system and to the messaging device. This connecting means also monitors the lock system and sends user related information to the messaging device. The contacting means automatically contacts the user with information related to the awaiting messages.

DETAILED DESCRIPTION

The present invention provides an apparatus and a method for connecting a messaging system with a door lock system. The messaging system can be any multimedia messaging system including telephone voice mail, video mail, electronic mail (i.e., e-mail) messages, facsimile messaging system and the like. The door lock system can be located in various environments. For example, the already existing electronic door lock systems in hotels can be utilized, or electronic door locks can be placed in a business (or other) environment.

Figure 1:
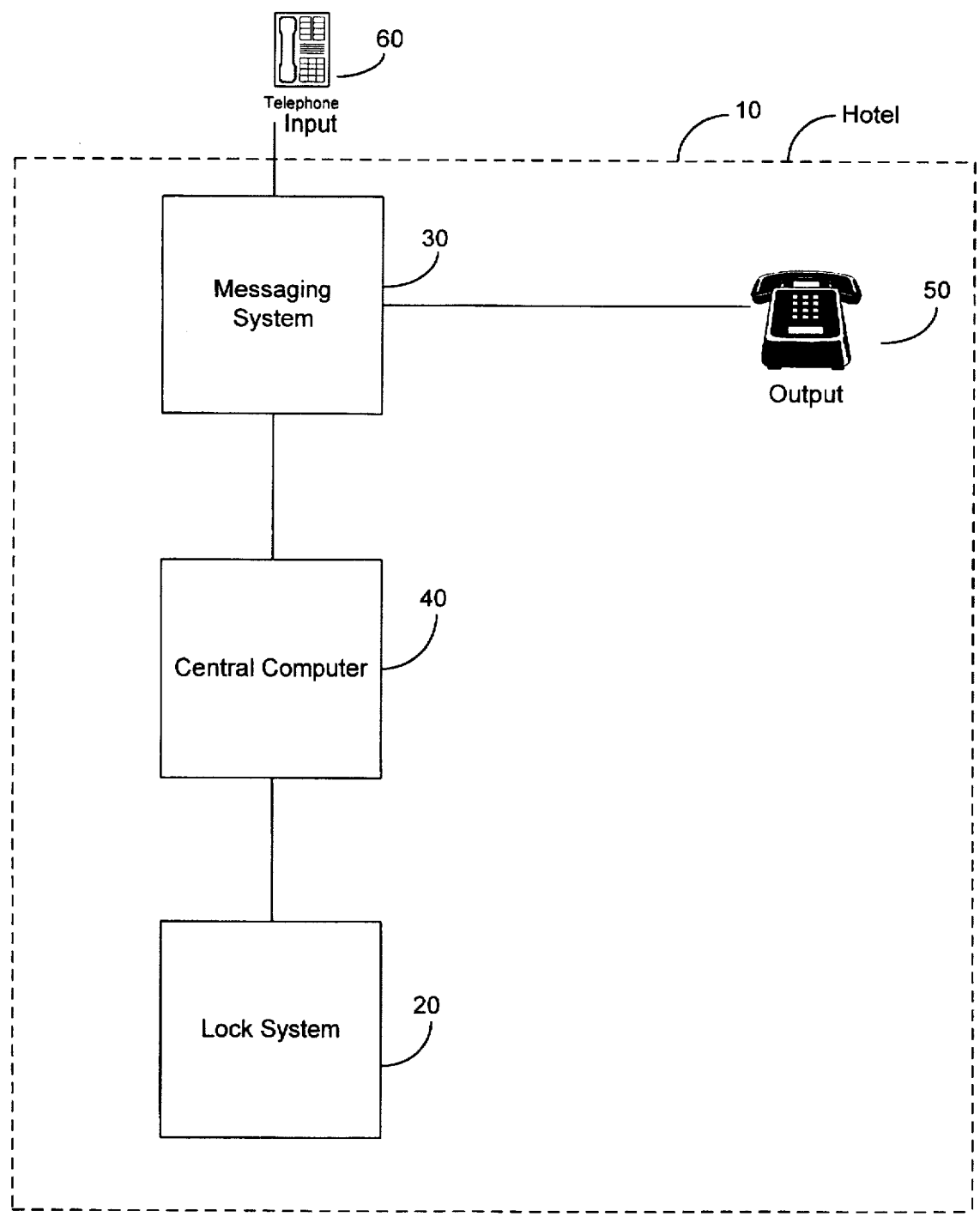
FIG. 1 illustrates the basic subsystems of the present invention in a hotel environment.

In one embodiment of the invention, the electronic door lock system is located in a hotel environment. FIG. 1 illustrates the basic subsystems of the present invention in a hotel environment. Hotel 10 includes a lock system 20, a messaging system 30, a central computer 40 and an output 50. Messages are placed in messaging system 30 by input 60. In this example, input 60 is a telephone located outside of hotel 10. As stated above, many hotels already utilize electronic door locks. Electronic door lock system 20 is usually operated by either magnetically or mechanically encoded cards which are programmed specifically for each guest/user. These encoded cards act as hardware passwords which can open the users' multimedia messaging mailbox(es).

Many hotels use a voice mail messaging system 30. Usually, the password protection provided by that system is not utilized by the hotel because they do not want to administer the distribution and tracking of the passwords. As a result, anyone who picks up a telephone in a hotel room can access the associated voice mail messaging system. This gives access to maids, bellhops and everyone else with access to the hotel rooms. This results in inherently insecure voice mail messaging systems.

In addition to messaging system 30, a hotel may include central computer 40. Often door lock system 20 is linked to central computer 40 such that each electronic card inserted into a door is checked by central computer 40. When the check is positive, the lock is opened by a command from central computer 40. In the preferred embodiment, a guest's electronic card produces a different electronic code from other individuals' electronic codes (e.g., the maid's electronic code). Therefore, while both electronic cards can open the door, only the guest's electronic card causes central computer 40 to trigger multimedia messaging system 30.

Figure 2:
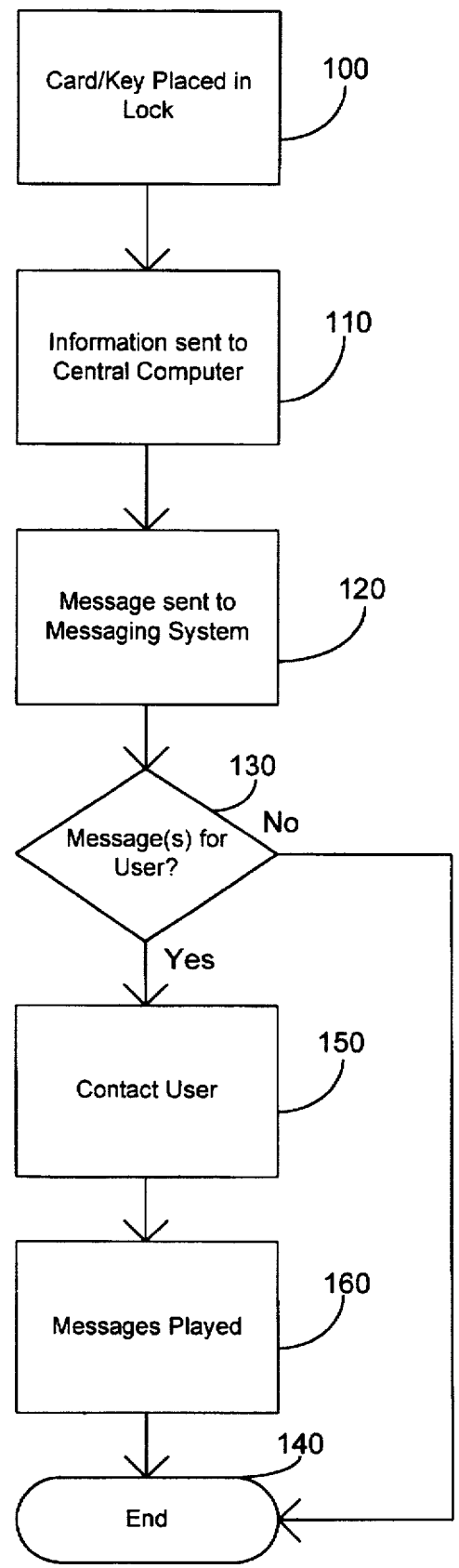
FIG. 2 illustrates a process flow chart for the present invention.

FIG. 2 illustrates a process flow chart for the present invention. At step 100, the electronic: card or key is placed in the door lock. At step 110, information related to the electronic card and the door lock is sent to the central computer. When a guest inserts an electronic card into the door lock, the central computer checks the electronic card. If the check is positive, the central computer sends a signal which activates (or opens) the guest's door lock. At step 120, the central computer sends a command over, for example, a digital link to the messaging system. This command identifies the guest. Identification can be in relation to the guest's room number, the guest's mailbox number, the guest's telephone extension number or the like. The messaging system then checks to see if there are any messages for the identified guest at step 130. If there are no messages, the process ends at step 140.

If a message(s) is present, the messaging system sends a command over, for example, a digital link to a switch to contact the guest/user at step 150. For example, a command can be sent to the hotel telephone system or a PBX (private branch exchange) such that a call is placed to the guest's room. A short delay can be inserted (e.g., 5 seconds) to allow the user to get inside the room before the telephone starts to ring. At step 160, the message(s) is played for the guest. For example, when the user answers the telephone, an automated message could begin by saying "you have N new message(s)." and then the messaging system could play the message(s) for the user. By providing this contacting feature, messaging system security, usability and administration is improved.

When a user checks into a hotel which utilizes the present system, a telephone number for changing the system options can be provided to the user. For example, the user could dial this telephone number and change the delay to a longer period of time (e.g., 30 seconds) to give the user more time to get settled in the room before the telephone started to ring. The telephone call could then connect the user to the user's message mailbox. This "option change" telephone number can also be used to avoid disturbing customers/users. The user could, if desired, change their options (by using the telephone number) to disable their automatic contacting feature.

In this arrangement, messages can only be retrieved by inserting an electronic card or key into the door. If the electronic card is lost, security is compromised, but that already occurs with the prior art system because anyone with access to a room can retrieve messages.

In another embodiment of the present invention, the electrical or mechanical locks are not connected to a central computer. In this situation, an electronic card or a key is coded at the hotel's front desk with a code including the hotel room number and the dates of the guest's stay, if applicable. The door lock is preprogrammed to accept any card or key with the correct coded room number and dates. The lock is self-contained and sometimes battery operated. Thus, this type of lock does not connect to the front desk or to a central computer. To modify this lock for the present invention, the lock is connected to a central computer via a wired or a wireless connection. For example, an electrical wire for transferring electrical signals can be used to connect each lock with the central computer, or transmitters/receivers can be located on both the door locks and the central computer for transferring wireless signals. The locks could also be designed to attach to the telephone line already in the room with wires or a wireless connection. If the telephone line is used, dual tone multi frequency (DTMF) tones or other signals can be transmitted to the messaging system to communicate the unlocking of the door with the guest's card/key. If DTMF tones are used, a special telephone number is utilized to connect the door lock to the central computer. Then, the relevant data is sent with more DTMF tones or with any other data transmission standard (e.g., a modem standard).

Additionally, in the hotel example, if multiple users are sharing a room, each user could be checked in separately and given a different electronic card/key which refers to that user's message mailbox. When a caller specifies a guest name, messages from that caller are then directed to the appropriate guest's mailbox. Therefore, multiple guests can retrieve messages from their individual mailboxes without additional administration costs and without compromising security. Moreover, separate identifications or passwords are not needed.

In a business environment, electronic office door locks can be utilized in the same way as the hotel door locks. Again, a connection would be provided between the electronic office door locks and the business' messaging system. Many businesses already have electronic office door locks which track each employee's arrival (or other) time. These systems usually include a central computer for tracking the time. After the central computer is connected to the messaging system, the central computer can be used to implement the present invention. As set forth above, the central computer can detect when a user has entered a room. A signal is then sent to the messaging system. The messaging system checks for awaiting messages and evaluates the possibility of contacting the user.

In another embodiment, the present invention is used in a telecommuting center environment. A telecommuting center is used when multiple individuals share one office or work space. For example, several salespeople who are usually "on the road" may be able to share the same office. In the past, these salespeople could dial a code into their common telephone to identify themselves and retrieve their telephone messages. With the present invention, electronic keys can be used for identifying the salespeople and giving access to messages. After the central computer identifies the individual using the shared office, the central computer can allow the identified user to be contacted through the common telephone. For example, the identified user's telephone extension would ring on the common telephone. Optionally, the user could also utilize the electronic key when exiting the shared office to both (1) lock the door and (2) indicate that the user was vacating the area. Thus, the user's telephone extension would not ring the common telephone after the user had left the shared office. In another arrangement of this embodiment, the electronic key could work in a wireless fashion to indicate to the central computer when a user had entered and/or exited a shared office. For example, a receiver located in the shared office could receive user identification information transmitted from the electronic key and then transfer that information to the central computer. When the transmission from the electronic key ended, information could be sent to the central computer indicating that the user had left the shared office.

We claim:

1. A system for notifying a user of awaiting messages, comprising:
   a messaging device;
   a lock system;
   connecting means for processing signals from the lock system and to the messaging device, the connecting means monitoring the lock system and sending user related information to the messaging device; and
   contacting means for immediately and automatically contacting the user with information for notifying the user of awaiting messages when the lock system detects a user.

2. The system for notifying a user of awaiting messages of claim 1, wherein the connecting means includes a central computer for coordinating information and for communicating with the lock system and the messaging device.

3. The system for notifying a user of awaiting messages of claim 1, wherein the lock system is located in at least one of a hotel and a telecommuting center.

4. The system for notifying a user of awaiting messages of claim 1, wherein the messaging device is at least one of a voice mail system, a video mail system, an electronic mail system and a fax messaging system.

5. The system for notifying a user of awaiting messages of claim 1, wherein the connecting means includes at least one of a wired electrical connection and a wireless connection.

6. The system for notifying a user of awaiting messages of claim 5, wherein the wired electrical connection is a hotel telephone system.

7. The system for notifying a user of awaiting messages of claim 1, wherein the lock system is an electronic door lock.

8. The system for notifying a user of awaiting messages of claim 7, wherein the electronic door lock works with encoded locks, each of the encoded locks being programmed for a specific user.

9. The system for notifying a user of awaiting messages of claim 7, wherein the connecting means determines when the electronic door lock is activated in response to a user input.

10. A method for notifying a user of awaiting messages, comprising the steps of:
    activating a lock system;

transmitting a first signal from the lock system to a central computer, the first signal notifying the central computer of the lock system activation and identifying the user;

transmitting a second signal from the central computer to a messaging system, the second signal notifying the messaging system of the lock system activation and identifying the user; and automatically and immediately contacting the user with information for notifying the user of awaiting messages when the first signal is received by the central computer.

11. The method for notifying a user of awaiting messages of claim 10, further comprising the step of playing the awaiting messages for the user.

12. The method for notifying a user of awaiting messages of claim 10, wherein the lock system is located in at least one of a hotel and a telecommuting center.

13. The method for notifying a user of awaiting messages of claim 10, wherein the messaging device is at least one of a voice mail system, a video mail system, an electronic mail system and a fax messaging system.

14. The method for notifying a user of awaiting messages of claim 10, wherein the transmitting of the first signal is done over at least one of a wired electrical connection and a wireless connection.

15. The method for notifying a user of awaiting messages of claim 10, wherein the transmitting of the second signal is done over at least one of a wired electrical connection and a wireless connection.

16. The method for notifying a user of awaiting messages of claim 10, wherein the lock system is an electronic door lock.

17. The method for notifying a user of awaiting messages of claim 16, wherein the electronic door lock works with encoded locks, each of the encoded locks being programmed for a specific user.

18. The method for notifying a user of awaiting messages of claim 16, wherein the central computer determines when the electronic door lock is activated in response to a user input.

* * * * *